E. OSBORN.
Running-Gears for Vehicles.

No. 152,764. Patented July 7, 1874.

WITNESSES:
George Cushing
A. H. Norris

INVENTOR:
Elijah Osborn.
By James L. Norris
Atty.

THE GRAPHIC CO. PHOTO-LITH. 39 & 41 PARK PLACE, N.Y.

UNITED STATES PATENT OFFICE.

ELIJAH OSBORN, OF SPENCER, NEW YORK, ASSIGNOR OF ONE-HALF HIS RIGHT TO MARSHALL C. WEST, OF SAME PLACE.

IMPROVEMENT IN RUNNING-GEARS FOR VEHICLES.

Specification forming part of Letters Patent No. 152,764, dated July 7, 1874; application filed May 28, 1874.

*To all whom it may concern:*

Be it known that I, ELIJAH OSBORN, of Spencer, in the county of Tioga and State of New York, have invented certain new and useful Improvements in Platform-Gear for Carriages, of which the following is a specification:

This invention relates to certain improvements in platform-gear for wagons, carriages, and other wheeled vehicles; and the invention consists of a frame composed of three parts radiating or branching from a central opening, through which the king-bolt passes, one of said arms being connected with the cross-spring, and the other two branching arms being connected to the front ends of the side springs, which are supported by the front axle, and thus the platform is securely retained in position, and supported by the cross and side springs.

The frame constructed as above described is supported against a downward pressure by means of a truss-frame composed of three radiating or branching arms corresponding with the arms of the frame, and connected thereto by interposed pillars or studs.

Figure 1:
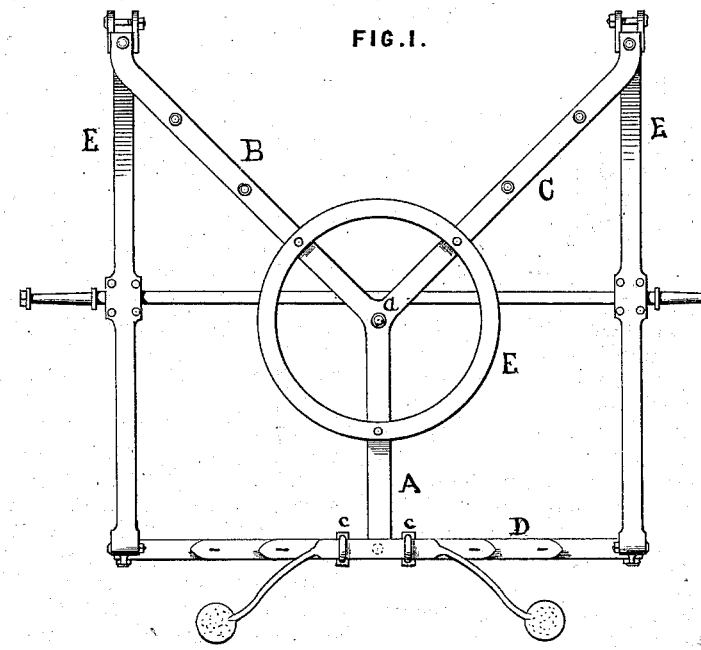
Figure 2:
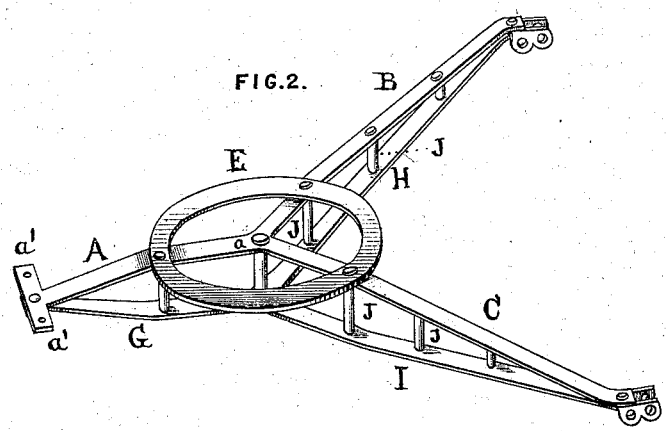

In the drawings, Figure 1 is a plan view of my platform attached to the springs, and Fig. 2 a perspective view of the platform.

The letters A B C represent three arms, which branch or radiate from a central opening, $a$, through which the king-bolt of the vehicle passes. The arm A, which extends rearwardly when the platform is in position, is preferably provided with short lateral arms $a'$ $a'$, for connecting the same between the cross-spring D and a bar, $b$, to which the steps $b$ are welded, said bar $b$ and cross-spring being connected together by the clips $c$, and confining the rear arm A of the platform between them. The ends B C of the frame are for connection with the front ends of the side springs E, which are supported by the front axle of the vehicle, the rear ends of the side springs being attached to the ends of the cross-springs D. The branching arms carry the lower section of the fifth-wheel or circle E, which they support at three different points, and the front ends of the arms may be connected together by the ordinary spring-bar, for assisting in supporting the side springs against a lateral movement, and the ends of the arms B C are also provided with suitable clips, for the attachment of the thills of the shafts, or a pole or tongue, if the latter be used. In order to support the arms against a downward pressure, I brace the same by means of a truss-frame constructed of three branching arms, G H I, similar in shape to the arms A B C, and connected to the same by interposed pillars or studs J, and at their ends by suitable bolts, said pillars or studs being preferably hollow to secure lightness and strength. By this means the frame is strengthened and supported against a downward pressure; and, furthermore, the frame, constructed as herein described, is much lighter than those now in use, while it possesses the requisite strength, and is capable of withstanding any ordinary strain to which it may be subjected; and, further, requires less material than those heretofore constructed, thus reducing its cost and weight.

I am aware that a fifth-wheel has been supported by two bars arranged to cross each other to form four arms, which are braced by a truss-frame consisting of two bars crossing each other, the rear ends of said bars connecting with the ends of the side springs, and the front ends connecting with the front ends of the side springs; but such I do not claim in this application.

I claim as my invention—

1. A platform for wheeled vehicles consisting of three branching arms, one of said arms being for connection with the cross-spring, and the other two arms for connection to the side springs, and the whole combined with and supporting the fifth-wheel, substantially as described.

2. The combination of the three branching arms A B C with the truss-frame arms G, H, and I, and the interposed pillars, substantially as described.

In testimony that I claim the foregoing I have hereunto set my hand and seal.

ELIJAH OSBORN. [L. S.]

Witnesses:
 JNO. G. KINNEY,
 SILVENES SHEPARD.